(12) United States Patent
Bohling et al.

(10) Patent No.: US 11,841,830 B2
(45) Date of Patent: Dec. 12, 2023

(54) DYNAMIC SWITCHING OF CATALOG SHARING PROTOCOLS

(71) Applicant: International Business Machines Corporation, Armonk, NY (US)

(72) Inventors: Neal E. Bohling, San Jose, CA (US); Franklin E. McCune, Tucson, AZ (US); David C Reed, Tucson, AZ (US); Max D. Smith, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 795 days.

(21) Appl. No.: 14/929,356

(22) Filed: Nov. 1, 2015

(65) Prior Publication Data
US 2017/0124133 A1 May 4, 2017

(51) Int. Cl.
*G06F 16/176* (2019.01)
*G06F 16/188* (2019.01)

(52) U.S. Cl.
CPC .......... *G06F 16/176* (2019.01); *G06F 16/188* (2019.01)

(58) Field of Classification Search
None
See application file for complete search history.

(56) References Cited

U.S. PATENT DOCUMENTS

| | | | |
|---|---|---|---|
| 6,675,175 B2* | 1/2004 | Branch | G06F 17/30008 |
| 6,986,156 B1* | 1/2006 | Rodriguez | H04H 20/10 |
| | | | 348/E17.005 |
| 9,137,849 B1* | 9/2015 | Wright | H04W 88/026 |
| 9,351,197 B2* | 5/2016 | Yacovitch | H04W 28/12 |
| 2005/0192962 A1* | 9/2005 | Furrer | G06F 17/30893 |
| 2010/0031285 A1* | 2/2010 | Haberman | H04N 21/2385 |
| | | | 725/34 |
| 2013/0080652 A1 | 3/2013 | Cradick et al. | |
| 2014/0188888 A1 | 7/2014 | Harris et al. | |
| 2014/0376405 A1* | 12/2014 | Erickson | H04W 76/10 |
| | | | 370/254 |
| 2017/0060537 A1* | 3/2017 | Mack | G06F 8/20 |

OTHER PUBLICATIONS

Bruce Mah; An Empirical Model of HTTP Network Traffic ; IEEE; 1997;pp. 1-9 (Year: 1997).*

* cited by examiner

*Primary Examiner* — Albert M Phillips, III
*Assistant Examiner* — Jermaine A Mincey
(74) *Attorney, Agent, or Firm* — Nelson IP; Daniel P. Nelson (57) ABSTRACT

A method to dynamically switch between catalog sharing protocols includes monitoring, over a period of time, access to a catalog used to index data sets. Using information gathered during this monitoring period, the method divides the period of time into intervals based on which of a plurality of sharing protocols, used to access the catalog, would provide the best performance during the respective interval. The method schedules the sharing protocols to operate during their respective intervals going forward, and switches between the sharing protocols in accordance with the schedule. In certain embodiments, switching between the sharing protocols includes temporarily operating in a hybrid mode in which multiple sharing protocols operate simultaneously. When using this hybrid mode, the switch may occur when one sharing protocol begins to perform better than the other. A corresponding system and computer program product are also disclosed.

20 Claims, 6 Drawing Sheets

Sample Schedule 400

1 p.m. – 3 p.m.: High Cache Hit Ratio → ECS Sharing 3 p.m. – 8 p.m.: High Cache Purge Count → RLS Sharing 8 p.m. – 12 a.m.: Peak RLS Usage → ECS Sharing 12 a.m. – 1 a.m.: Normal Period → RLS Sharing

DYNAMIC SWITCHING OF CATALOG SHARING PROTOCOLS

BACKGROUND

Field of the Invention

This invention relates to systems and methods for selecting an optimal sharing protocol for accessing a catalog data set.

Background of the Invention

In the Multiple Virtual Storage (MVS) operating system, Catalog (hereinafter referred to as "the catalog component") is a heavily used component that enables data sets to be located and accessed. The catalog component is involved in a wide variety of different operations, including allocating new data sets, open and close processing, extend processing, and the like. Because of this, the catalog component can be a bottleneck when performing different operations. The sharing protocol used to share a catalog data set (managed by the catalog component) can make the difference between jobs running for minutes or hours. Currently, the catalog component uses two different sharing protocols to share a catalog data set, namely Enhanced Catalog Sharing (ECS) and Record Level Sharing (RLS). These protocols share the catalog data set in significantly different ways, with each providing advantages and disadvantages in different situations.

Enhanced Catalog Sharing (ECS) is a sharing protocol that relies on a "sharing control block" that is used to keep local catalog cache synchronized between systems. This is the same technique that is used in conventional catalog sharing, except that in ECS the sharing control block is stored in a coupling facility as opposed to on disk. Because performing I/O to the coupling facility is much quicker than performing I/O to disk, ECS improves significantly performance over conventional catalog sharing.

Record Level Sharing (RLS) is a sharing protocol that may be used to take control of the catalog data set and share the data therein on a much more granular basis, specifically at the record level. This sharing protocol may enable the catalog data set to handle many concurrent requests, thereby increasing throughput. The RLS sharing protocol, however, is inefficient when performing sequential processing (reading or writing sequentially to records of a data set), due to the overhead involved. The RLS sharing protocol is also used by many components other than just the catalog component and thus can have its performance affected by other workloads.

In view of the foregoing, what are needed are systems and methods to select an optimal catalog sharing protocol to access a catalog data set. Ideally, such systems and methods will enable dynamic switching between catalog sharing protocols depending on which sharing protocol would be more efficient during a given time period. Further needed are systems and methods to efficiently transition between catalog sharing protocols.

SUMMARY

The invention has been developed in response to the present state of the art and, in particular, in response to the problems and needs in the art that have not yet been fully solved by currently available systems and methods. Accordingly, the invention has been developed to provide systems and methods to dynamically switch between catalog sharing protocols. The features and advantages of the invention will become more fully apparent from the following description and appended claims, or may be learned by practice of the invention as set forth hereinafter.

Consistent with the foregoing, a method to dynamically switch between catalog sharing protocols is disclosed herein. In one embodiment, such a method includes monitoring, over a period of time, access to a catalog used to index data sets. Using information gathered during this monitoring period, the method divides the period of time into intervals based on which of a plurality of sharing protocols, used to access the catalog, would provide the best performance during the respective interval. The method schedules the sharing protocols to operate during their respective intervals going forward, and switches between the sharing protocols in accordance with the schedule. In certain embodiments, switching between the sharing protocols includes temporarily operating in a hybrid mode in which multiple sharing protocols operate simultaneously. When using this hybrid mode, the switch may occur when one sharing protocol begins to perform better than the other.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

Figure 1:
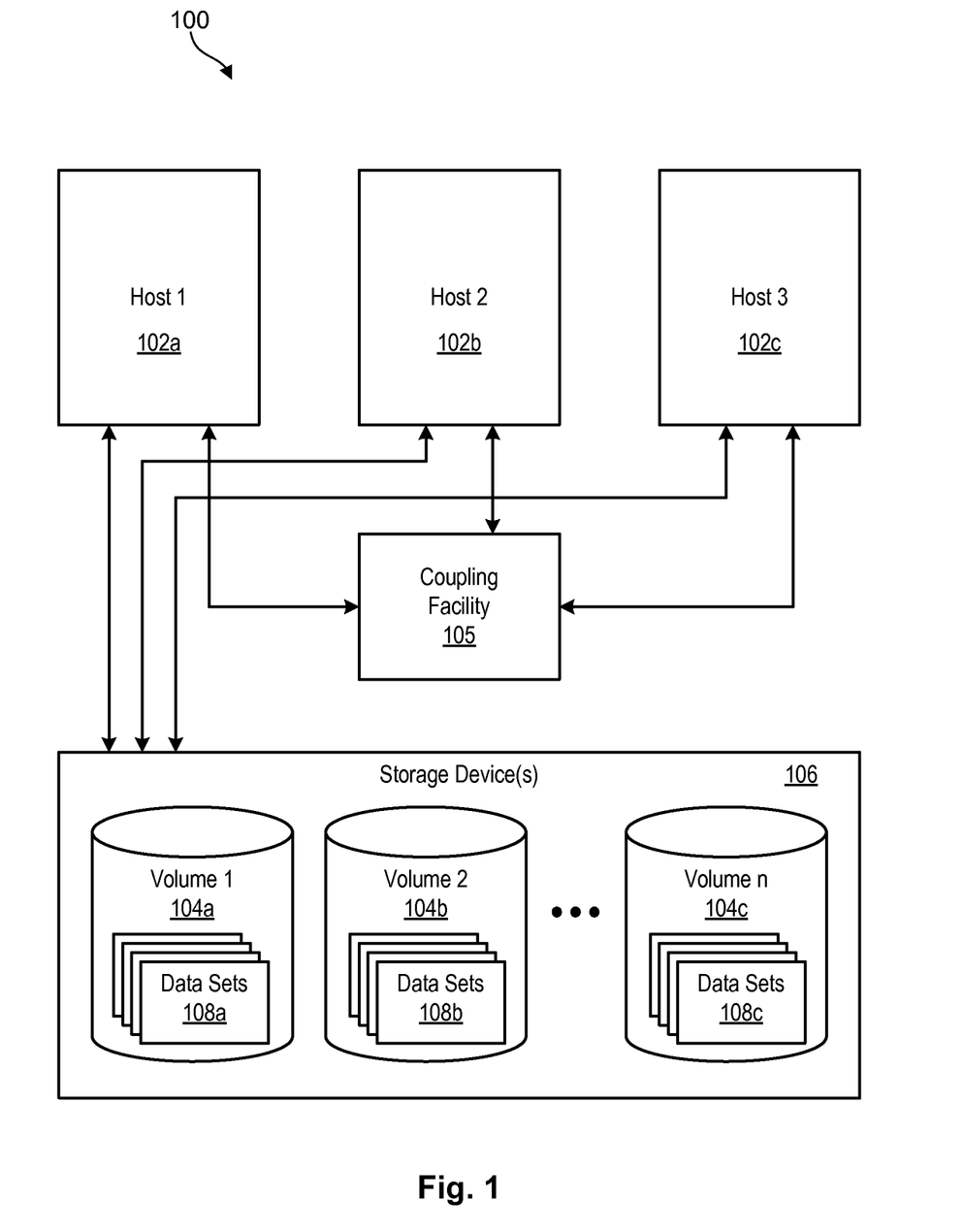
FIG. 1 is a high-level block diagram showing one example of an environment in which a system and method in accordance with the invention may operate.

Referring to FIG. 1, one embodiment an environment 100 for implementing a system and method in accordance with the invention is illustrated. In the illustrated embodiment, the environment 100 roughly corresponds to an IBM Sysplex® environment 100. Nevertheless, embodiments of the invention may not be limited to operating within an IBM Sysplex® environment 100 but may include any comparable or analogous environment, regardless of the manufacturer, product name, or components or component names associated with the environment. Furthermore, any environment that could benefit from one or more embodiments of the invention is deemed to fall within the scope of the invention. Moreover, systems and methods in accordance with the invention may be used in any environment that exhibits the same issues or problems disclosed herein. Such environments are also deemed to fall within the scope of the present invention. Thus, the Sysplex® environment 100 is presented only by way of example and is not intended to be limiting.

A Sysplex® environment 100 may be configured to enable multiple mainframe processors of host systems 102a-c to act as a single unit and share the same data, while ensuring data integrity, enabling resource sharing, and balancing workloads. For example, the host systems 102a-c may share data stored in one or more storage devices (e.g., DASD) volumes 104*a-c*. A coupling facility 105 may include computer hardware and/or software that enable the host systems 102*a-c* to share the same data. In certain embodiments, the coupling facility 105 may include cache 112 to store information shared among the attached host systems 102*a-c*.

As mentioned, the host systems 102*a-c* may share data stored in one or more volumes 104*a-c* stored on one or more storage devices 106. The storage devices 106 may include single disk drives or solid state drive s, arrays of disk drives or solid state drives, or other storage devices 106 known to those of skill in the art. The volumes 104*a-c* may reside on a single storage device 106 or span multiple storage devices 106. In certain embodiments, data in the volumes 104*a-c* is stored in the form of one or more data sets 108*a-c*.

Figure 2:
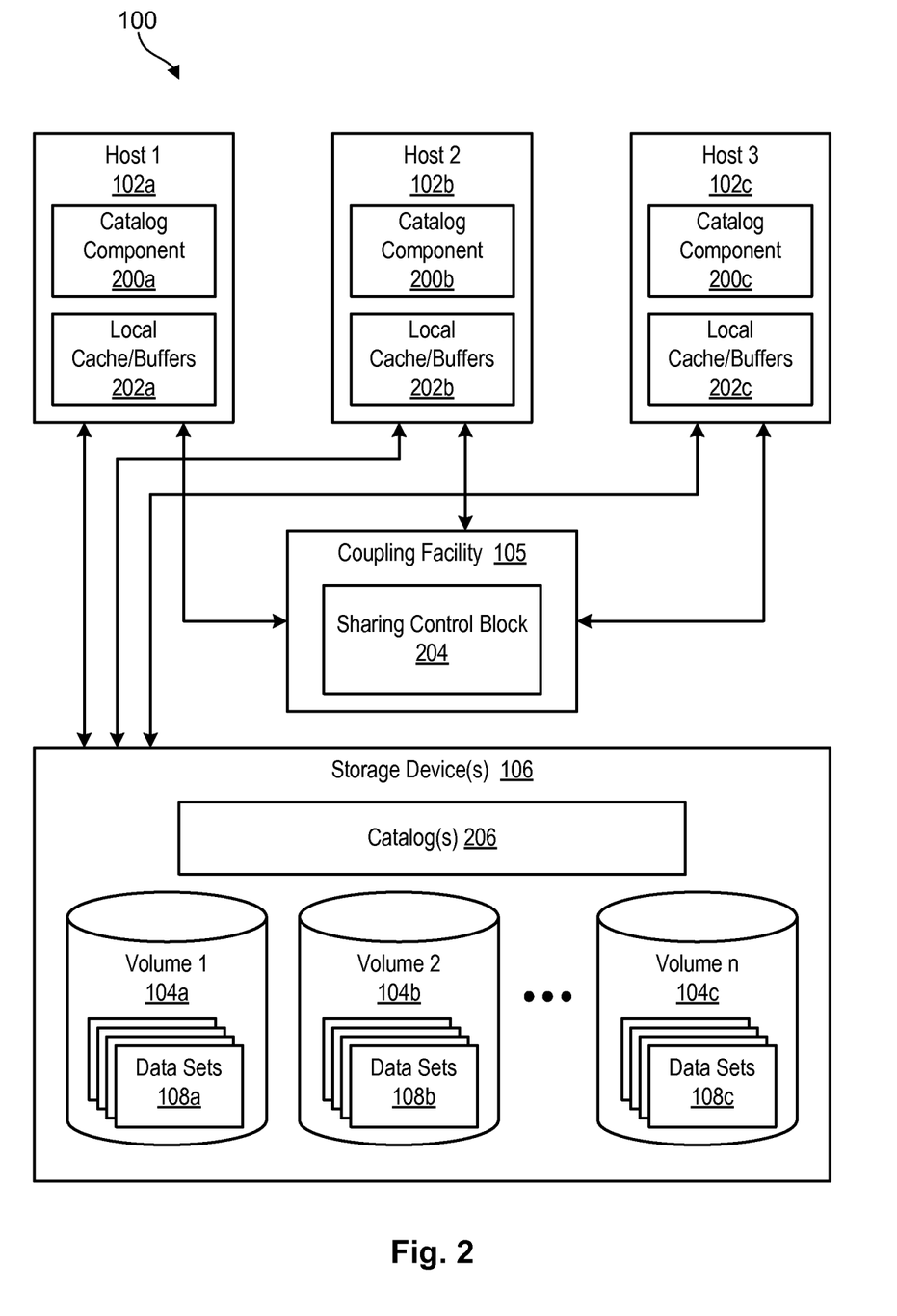
FIG. 2 is a high-level block diagram showing operation of a catalog component and catalog in the system of FIG. 1.

Referring to FIG. 2, as previously mentioned, in the Multiple Virtual Storage (MVS) operating system, the catalog component 200 is a heavily used component that enables data sets 108 to be located and accessed. The catalog component 200 is involved in a wide variety of different operations, including allocation of new data sets 108, open and close processing, extend processing, and the like. Because of this, the catalog component 200 can be a bottleneck when performing different operations. The sharing protocol used to share a catalog data set 206 (managed by the catalog component 200) can make the difference between jobs running for minutes or hours. Currently, the catalog component 200 uses two different sharing protocols to share a catalog data set 206, namely Enhanced Catalog Sharing (ECS) and Record Level Sharing (RLS). These protocols share the catalog data set 206 in significantly different ways, with each providing advantages and disadvantages in different situations.

Enhanced Catalog Sharing (ECS) is a sharing protocol that relies on a sharing control block 204 that is used to keep local catalog cache 202 synchronized between systems 102. In essence, the sharing control block 204 is a list of the most recently updated entries in a catalog 206. When a system 102 accesses a catalog 206 in its cache 202, the system 106 may first check the sharing control block 204 to see what updates were made to the catalog 206 since the last time it was accessed by the system 102. This allows the system to purge any outdated or stale catalog entries from its local cache 202. This is the same technique that is used in conventional catalog sharing, except that in ECS the sharing control block 204 is stored in a coupling facility 105 as opposed to on disk 106. Because performing I/O to the coupling facility 105 is much quicker than performing I/O to disk 106, ECS improves performance significantly over conventional catalog sharing.

Record Level Sharing (RLS) is a sharing protocol that may be used to take control of the catalog data set 206 and share the data therein on a much more granular basis, namely at the record level. This sharing protocol may enable the catalog data set 206 to handle multiple concurrent requests from different hosts 102, thereby increasing throughput. The RLS sharing protocol, however, is inefficient when performing sequential processing (reading or writing sequentially to records of a data set 108) due to the overhead involved with RLS. The RLS sharing protocol is also used by many components other than just the catalog component 200 and thus can have its performance affected by other workloads.

In view of the foregoing description, what are needed are systems and methods to select an optimal sharing protocol to access a catalog data set 206. Ideally, such systems and methods will enable dynamic switching between sharing protocols depending on which sharing protocol would be more efficient in a given situation or during a given time period. Further needed are systems and methods to efficiently transition between sharing protocols. One embodiment of such systems and methods is illustrated and discussed in association with FIG. 3.

Figure 3:
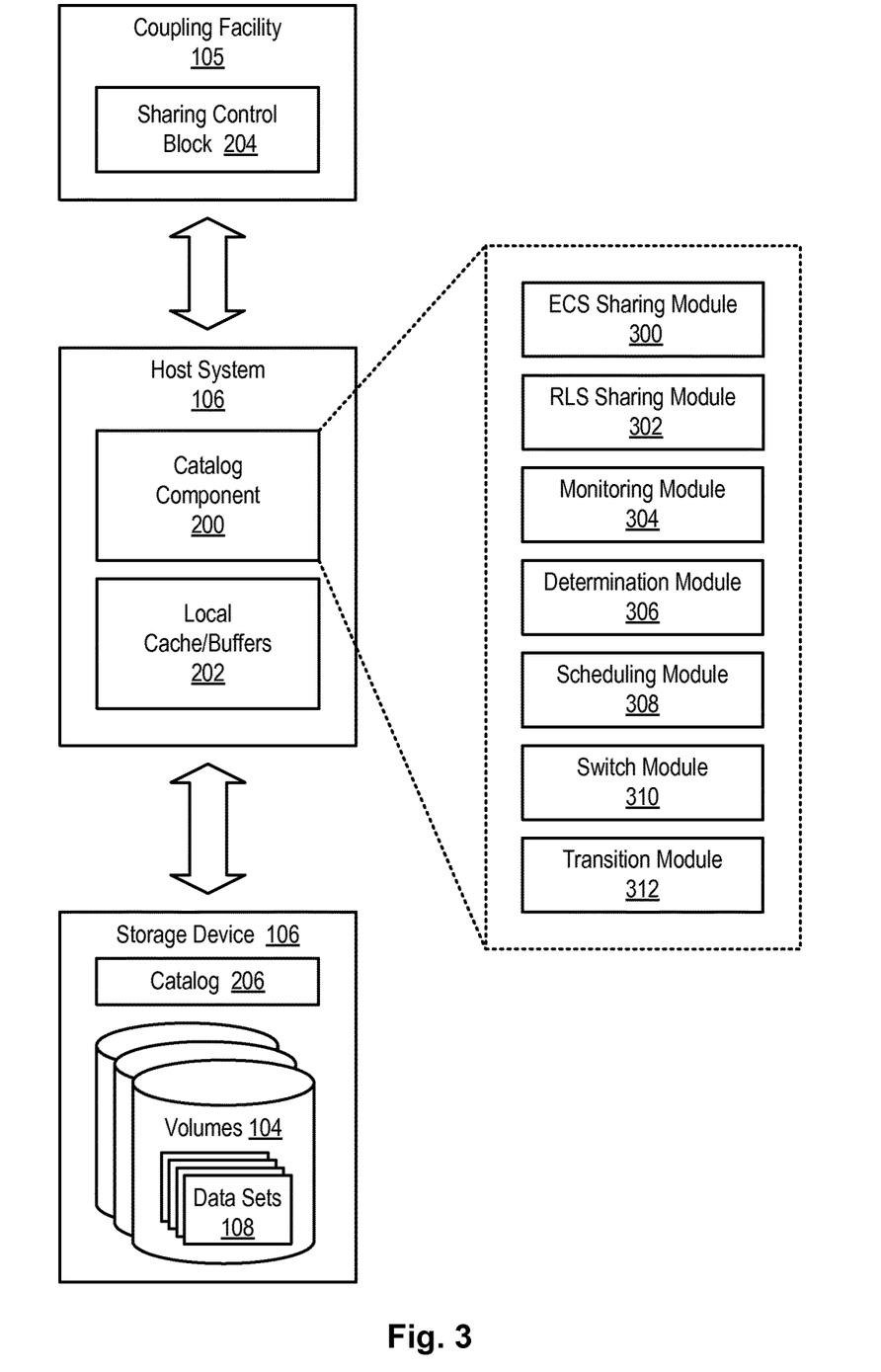
FIG. 3 is a high-level block diagram showing various modules that may be included in a catalog component in accordance with the invention.

As shown in FIG. 3, in certain embodiments in accordance with the invention, a catalog component 200 may be configured to dynamically switch between catalog sharing protocols depending on which sharing protocol would be more efficient in a particular situation or given time period. To accomplish, the catalog component 200 may be configured to include one or more sub-modules to perform various features and functions. As shown in FIG. 3, the catalog component 200 may include one or more of an ECS sharing module 300, RLS sharing module 302, monitoring module 304, determination module 306, scheduling module 308, switch module 310, and transition module 312.

The ECS sharing module 300 may be configured to implement the ECS sharing protocol previously discussed, while the RLS sharing module 302 may be configured to implement the RLS sharing protocol. The catalog component 200 may toggle between use of the ECS sharing module 300 and the RLS sharing module 302 depending on which sharing protocol is more efficient in a particular situation or during a given time period. In certain embodiments, an optimal sharing protocol is selected on a catalog-by-catalog basis. For example, at a given time or during a specified time period, a first catalog 206 may operate most efficiently using the ECS sharing protocol while a second catalog 206 may operate most efficiently using the RLS sharing protocol. The times these catalogs may switch between sharing protocols may also differ, depending on their workloads and other criteria. Thus, the catalog component 200 may be configured to select the most efficient sharing protocol as well as switch between catalog sharing protocols on a catalog-by-catalog basis.

In order to determine which sharing protocol is most efficient to access a catalog 206, a monitoring module 304 may be configured to monitor the catalog 206 over a period of time, such as for workload types, response times, historical information, and the like. For example, the monitoring module 304 may monitor one or more of a hit ratio to a local cache 202 used in association with a catalog 206; purge events to a local cache 202 used in association with a catalog 206; queuing of resources used to access a catalog 206; a workload of a sharing protocol used to access a catalog 206; response times to execute requests to a catalog 206; status of a sharing protocol used to execute requests to a catalog 206; workload type for requests to a catalog 206, and the like.

For example, the monitoring module 304 may monitor GET/PUT requests for type (specifically for sequential processing) as well as duration. If a significant number of GET/PUT requests that access data sequentially are received over a substantial amount of time, this may indicate that using the ECS sharing protocol to access the catalog 206 would be more efficient, as opposed to using RLS. Similarly, local caching statistics may be monitored for hit ratios and purge events to determine how well a cache 202 is being utilized. If significant time and resources are being used to populate a local cache 202 (as occurs with the ECS sharing protocol) but the hit ratio for the cache 202 is low or a significant amount of time is being used purging entries from the cache 202, this may indicate that use of ECS is non-optimal. Similarly, if the catalog component 200 is using the RLS sharing protocol but RLS is experiencing significant workload from other systems or applications that compete for RLS resources (thereby delaying requests made through RLS), then the RLS sharing protocol may not be optimal and it may be better to switch to ECS. In a similar manner, if queuing on a SYSIGGV resource (a resource used by ECS to serialize catalog data sets 206) is high, switching to RLS may improve performance.

Figure 4:
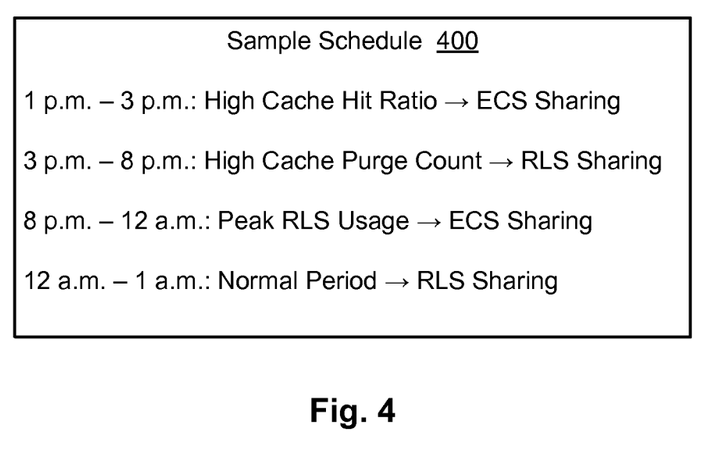
FIG. 4 is a high-level block diagram showing one example of a schedule that may be generated by the scheduling module.

Using information gathered by the monitoring module 304, a determination module 306 may determine when each sharing protocol is most efficient. This may be accomplished by dividing the time period into intervals based on which sharing protocol would provide the best performance during the respective intervals. The scheduling module 308 may then schedule the sharing protocols to operate during these intervals. One simple example of a schedule 400 is illustrated in FIG. 4. As shown in FIG. 4, from 1 p.m. to 3 p.m., the ECS sharing protocol is scheduled to operate because a high cache hit ratio is observed during this period (indicating high cache 202 utilization). From 3 p.m. to 8 p.m., the RLS sharing protocol is scheduled to operate since a high cache purge count is observed during this period, indicating low cache 202 utilization. From 8 p.m. to 12 a.m., the ECS sharing protocol is scheduled to operate since this time period is associated with peak RLS usage (thereby slowing down requests processed through RLS). From 12 a.m. to 1 a.m., the RLS sharing protocol is scheduled to operate as the default sharing protocol. Either RLS or ECS may be used as the default sharing protocol depending on the embodiment.

Referring again to FIG. 3, once the schedule 400 is established, the switch module 310 may switch between the sharing protocols in accordance with the established schedule 400. This schedule 400 may, in certain embodiments, be adjusted on the fly as needed. For example, if the RLS sharing protocol is scheduled to operate during a specified interval but RLS experiences an unexpected increase in workload during this period (thereby delaying requests make through RLS), the switch module 310 may switch to the ECS sharing protocol on the fly to account for this increased workload. In other cases, if queuing on the SYSIGGV2 resource previously discussed becomes unexpectedly high, the switch module 310 may switch to the RLS sharing protocol to improve throughput. Other on-the-fly alterations of the schedule 400 are possible and within the scope of the invention.

The transition module 312 may be configured to assist with the transition from one sharing protocol to another. Since both sharing protocols (i.e., ECS and RLS) require populated cache 202 and/or buffers 202 to operate efficiently, switching from one sharing protocol to another may require a period of I/O to populate the cache 202 and/or buffers 202 of the sharing protocol being switched to. In certain embodiments, the transition module 312 may process I/O requests in a hybrid manner (also referred to herein as operating in "hybrid mode") in order to populate the cache 202 and/or buffers 202 of a sharing protocol to enable a complete switch. In hybrid mode, both sharing protocols may operate in parallel until one sharing protocol is ready to take over operation from the other. In certain embodiments, during this parallel operation, the transition module 312 monitors performance of both sharing protocols and only switches from one sharing protocol to the other when the performance of the sharing protocol being switched to equals or exceeds the performance of the sharing protocol being switched from. This provides a more dynamic way of switching between sharing protocols. One example of a method for transitioning from the ECS sharing protocol to the RLS sharing protocol will be discussed in association with FIG. 5. One example of a method for transitioning from the RLS sharing protocol to the ECS sharing protocol will be discussed in association with FIG. 6.

Figure 5:
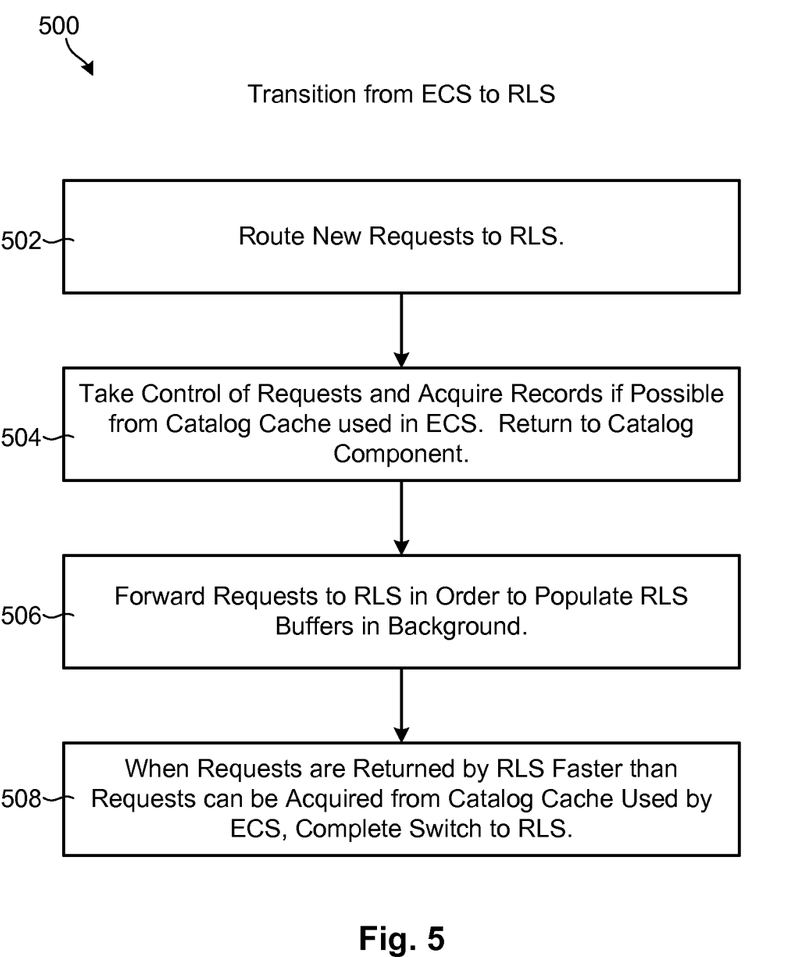
FIG. 5 is a flow diagram showing one example of a method for transitioning from the ECS sharing protocol to the RLS sharing protocol.

Referring to FIG. 5, one example of a method 500 for transitioning from the ECS sharing protocol to the RLS sharing protocol is illustrated. This method 500 is provided by way of example and not limitation. As shown, when new requests to the catalog 206 are received while transitioning from ECS to RLS, the method 500 routes 502 the new requests to RLS. The method 500 then takes 504 control of the requests and acquires 504, if possible, records associated with the requests from the catalog cache 202 used by ECS. The method 500 then returns 504 execution to the catalog component 200. The requests are then forwarded 506 to RLS in order to populate RLS buffers 202 in preparation to completely switch to the RLS sharing protocol. When requests are returned by the RLS sharing protocol faster than requests can be acquired and returned from the catalog cache 202 used by ECS, the method 500 completely switches 508 to the RLS sharing protocol.

Figure 6:
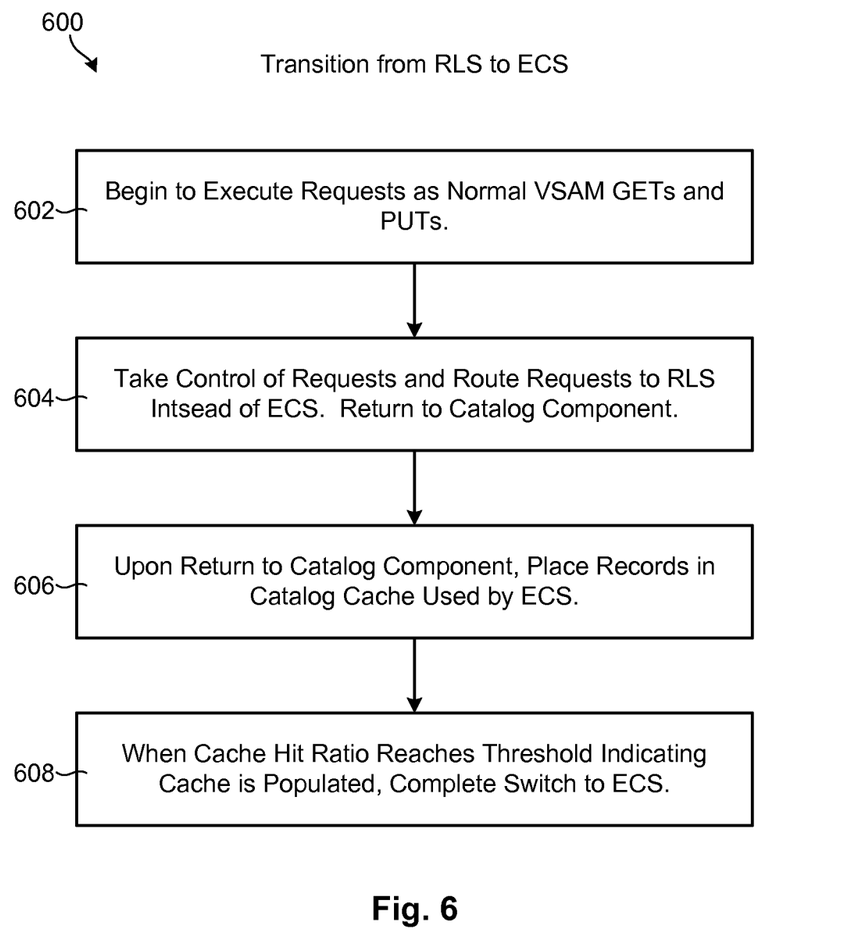
FIG. 6 is a flow diagram showing one example of a method for transitioning from the RLS sharing protocol to the ECS sharing protocol.

Referring to FIG. 6, one example of a method 600 for transitioning from the RLS sharing protocol to the ECS sharing protocol is illustrated. As shown, when new requests to the catalog 206 are received while transitioning from RLS to ECS, the method 600 begins 602 to execute the requests as normal GETs and PUTs as performed with ECS. The method 600 then takes 604 control of the requests and routes the requests to RLS instead of ECS. The method 600 then returns 604 execution to the catalog component 200. Upon returning 604 to the catalog component 200, the method 600 places 606 records returned in association with the requests into the catalog cache 202 used by ECS (thereby populating the cache 202 used by ECS). When a cache hit ratio associated with the cache 202 used by ECS reaches a threshold indicating that the cache 202 is populated, the method 600 completes 608 the switch to ECS.

Although particular reference has been made herein to the ECS and RLS sharing protocols, the systems and methods disclosed herein may, in certain cases, be equally applicable to other types of catalog sharing protocols. That is, the systems and methods disclosed herein may be used to optimize and switch between other types of sharing protocols used to access a catalog 206, including sharing protocols not specifically addressed herein. Thus, nothing in this description should be interpreted to indicate that the disclosed systems and methods are only applicable to the ECS and RLS sharing protocols.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method to dynamically switch between catalog sharing protocols, the method comprising:
utilizing a catalog to index a plurality of data sets;
monitoring, over a period of time, indicators associated with access to the catalog;
analyzing the indicators to determine which of a plurality of sharing protocols would be most efficient to access the catalog during the period of time;
dividing the period of time into predetermined intervals based on which of the plurality of sharing protocols would provide most efficient performance during the respective predetermined interval;
scheduling the sharing protocols to operate during their respective predetermined intervals going forward; and
switching between the sharing protocols in accordance with the schedule.

2. The method of claim 1, wherein switching between the sharing protocols comprises temporarily operating in a hybrid mode in which multiple sharing protocols operate simultaneously.

3. The method of claim 2, wherein temporarily operating in a hybrid mode comprises populating at least one of buffers and cache of a sharing protocol prior to completely switching to the sharing protocol.

4. The method of claim 2, wherein temporarily operating in a hybrid mode comprises completely switching to a first sharing protocol operating in the hybrid mode when the first sharing protocol is performing better than a second sharing protocol operating in the hybrid mode.

5. The method of claim 1, wherein the indicators include at least one of: a hit ratio to a local cache used in association with the catalog; purge events to a local cache used in association with the catalog; queuing of resources used to access the catalog; a workload of a sharing protocol used to access the catalog; response times to execute requests to the catalog; status of a sharing protocol used to execute requests to the catalog; and workload type for requests to the catalog.

6. The method of claim 1, wherein the sharing protocols comprise an Enhanced Catalog Sharing (ECS) sharing protocol.

7. The method of claim 1, wherein the sharing protocols comprise a Record Level Sharing (RLS) sharing protocol.

8. A computer program product to dynamically switch between catalog sharing protocols, the computer program product comprising a computer-readable medium having computer-usable program code embodied therein, the computer-usable program code comprising:
computer-usable program code to utilize a catalog to index a plurality of data sets;
computer-usable program code to monitor, over a period of time, indicators associated with access to the catalog;
computer-usable program code to analyze the indicators to determine which of a plurality of sharing protocols would be most efficient to access the catalog during the period of time;
computer-usable program code to divide the period of time into predetermined intervals based on which of the plurality of sharing protocols would provide most efficient performance during the respective predetermined interval;
computer-usable program code to schedule the sharing protocols to operate during their respective predetermined intervals going forward; and
computer-usable program code to switch between the sharing protocols in accordance with the schedule.

9. The computer program product of claim 8, wherein switching between the sharing protocols comprises temporarily operating in a hybrid mode in which multiple sharing protocols operate simultaneously.

10. The computer program product of claim 9, wherein temporarily operating in a hybrid mode comprises populating at least one of buffers and cache of a sharing protocol prior to completely switching to the sharing protocol.

11. The computer program product of claim 9, wherein temporarily operating in a hybrid mode comprises completely switching to a first sharing protocol operating in the hybrid mode when the first sharing protocol is performing better than a second sharing protocol operating in the hybrid mode.

12. The computer program product of claim 8, wherein the indicators include at least one of: a hit ratio to a local cache used in association with the catalog; purge events to a local cache used in association with the catalog; queuing of resources used to access the catalog; a workload of a sharing protocol used to access the catalog; response times to execute requests to the catalog; status of a sharing protocol used to execute requests to the catalog; and workload type for requests to the catalog.

13. The computer program product of claim 8, wherein the sharing protocols comprise an Enhanced Catalog Sharing (ECS) sharing protocol.

14. The computer program product of claim 8, wherein the sharing protocols comprise a Record Level Sharing (RLS) sharing protocol.

15. A system to dynamically switch between catalog sharing protocols, the system comprising:
at least one processor;
at least one memory device operably coupled to the at least one processor and storing instructions for execution on the at least one processor, the instructions causing the at least one processor to:
utilize a catalog to index a plurality of data sets;
monitor, over a period of time, indicators associated with access to the catalog;
analyze the indicators to determine which of a plurality of sharing protocols would be most efficient to access the catalog during the period of time;
divide the period of time into predetermined intervals based on which of the plurality of sharing protocols would provide most efficient performance during the respective predetermined interval;
schedule the sharing protocols to operate during their respective predetermined intervals going forward; and
switch between the sharing protocols in accordance with the schedule.

16. The system of claim 15, wherein switching between the sharing protocols comprises temporarily operating in a hybrid mode in which multiple sharing protocols operate simultaneously.

17. The system of claim 16, wherein temporarily operating in a hybrid mode comprises populating at least one of buffers and cache of a sharing protocol prior to completely switching to the sharing protocol.

18. The system of claim 16, wherein temporarily operating in a hybrid mode comprises completely switching to a first sharing protocol operating in the hybrid mode when the first sharing protocol is performing better than a second sharing protocol operating in the hybrid mode.

19. The system of claim 15, wherein the indicators include at least one of: a hit ratio to a local cache used in association with the catalog; purge events to a local cache used in association with the catalog; queuing of resources used to access the catalog; a workload of a sharing protocol used to access the catalog; response times to execute requests to the catalog; status of a sharing protocol used to execute requests to the catalog; and workload type for requests to the catalog.

20. The system of claim 15, wherein the sharing protocols comprise an Enhanced Catalog Sharing (ECS) sharing protocol and a Record Level Sharing (RLS) sharing protocol.

\* \* \* \* \*